United States Patent
Kwon et al.

(10) Patent No.: US 8,605,160 B2
(45) Date of Patent: Dec. 10, 2013

(54) CAMERA SHAKE CORRECTION DEVICE AND IMAGING DEVICE

(75) Inventors: Honam Kwon, Kanagawa-ken (JP); Kazuhiro Suzuki, Tokyo (JP); Risako Ueno, Tokyo (JP); Hideyuki Funaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 68 days.

(21) Appl. No.: 13/445,292

(22) Filed: Apr. 12, 2012

(65) Prior Publication Data

US 2013/0076923 A1   Mar. 28, 2013

(30) Foreign Application Priority Data

Sep. 27, 2011   (JP) ................. 2011-211367

(51) Int. Cl.
*H04N 5/228* (2006.01)
*G03B 17/00* (2006.01)

(52) U.S. Cl.
USPC ............ 348/208.7; 348/208.99; 396/55

(58) Field of Classification Search
USPC ............ 348/208.99, 208.7; 396/55
See application file for complete search history.

(56) References Cited

U.S. PATENT DOCUMENTS

| | | | |
|---|---|---|---|
| 6,515,489 B2 | 2/2003 | Min et al. | |
| 6,657,360 B2 | 12/2003 | Jerman et al. | |
| 6,819,822 B2 | 11/2004 | Behin et al. | |
| 7,505,677 B2 | 3/2009 | Kim et al. | |
| 8,319,844 B2 * | 11/2012 | Kimura | 348/208.99 |
| 2006/0279638 A1 * | 12/2006 | Matsuda et al. | 348/208.7 |
| 2008/0100715 A1 * | 5/2008 | Chang et al. | 348/208.7 |
| 2009/0091632 A1 * | 4/2009 | Okamoto et al. | 348/208.7 |
| 2011/0221915 A1 * | 9/2011 | Takano et al. | 348/208.7 |
| 2011/0249131 A1 * | 10/2011 | Topliss et al. | 348/208.7 |

FOREIGN PATENT DOCUMENTS

| | | |
|---|---|---|
| JP | 2009-290895 | 12/2009 |
| JP | 2010-250045 | 11/2010 |

OTHER PUBLICATIONS

Jin Chern Chiou, et al., "Design, Fabrication, and Package of MEMS-Based Image Stabilizer for Photographic Cell Phone Applications", International Conference on Optical MEMS & Nanophotonics 2010, 2 pages.

* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

According to one embodiment, a camera shake correction device includes a substrate, a fixed part, a linking part, a movable part, a first spring part, a second spring part, a first damper, and a second damper. The fixed part is provided on the substrate and fixed to the substrate. The linking part is provided around the fixed part on the substrate that can move in a first direction within a plane of the substrate with respect to the fixed part. The movable part is provided on the substrate and arranged around the fixed part and the linking part that can move in a second direction that intersects with the first direction within the plane of the substrate.

20 Claims, 13 Drawing Sheets

CAMERA SHAKE CORRECTION DEVICE AND IMAGING DEVICE

CROSS-REFERENCE TO RELATED APPLICATIONS

This application is based upon and claims the benefit of priority from the prior Japanese Patent Application No. 2011-211367, filed on Sep. 27, 2011; the entire contents of which are incorporated herein by reference.

FIELD

Embodiments described herein relate generally to a camera shake correction device and an imaging device.

BACKGROUND

In some solid state imaging devices, a camera shake correction device that adjusts the relative position between the imaging lens and the imaging sensor is provided for suppressing camera shake at the time of imaging. In existing camera shake correction devices, an electromagnetic actuator type voice coil motor (VCM) is widely used. In recent years, there has been demand to miniaturize camera shake correction devices in conjunction with the miniaturization of imaging elements.

BRIEF DESCRIPTION OF THE DRAWINGS

FIG. 2A is a cross-sectional view according to the line A-A' illustrated in FIG. 1, FIG. 2B is a cross-sectional views according to the line B-B' illustrated in FIG. 1, and FIG. 2C is a cross-sectional view according to the line C-C' illustrated in FIG. 1;

FIG. 5A illustrates an example of prior to camera shake, FIG. 5B illustrates when the camera shake correction device is not provided, and FIG. 5C illustrates when the camera shake correction device is provided;

FIG. 7A is a cross-sectional view according to the line A-A' illustrated in FIG. 6, FIG. 7B is a cross-sectional view according to the line B-B' illustrated in FIG. 6, and FIG. 7C is a cross-sectional view according to the line C-C illustrated in FIG. 6;

FIG. 12A is a cross-sectional view according to the line A-A' illustrated in FIG. 11 and FIG. 12B is a cross-sectional view according to the line B-B' illustrated in FIG. 11.

DETAILED DESCRIPTION

Figure 1:
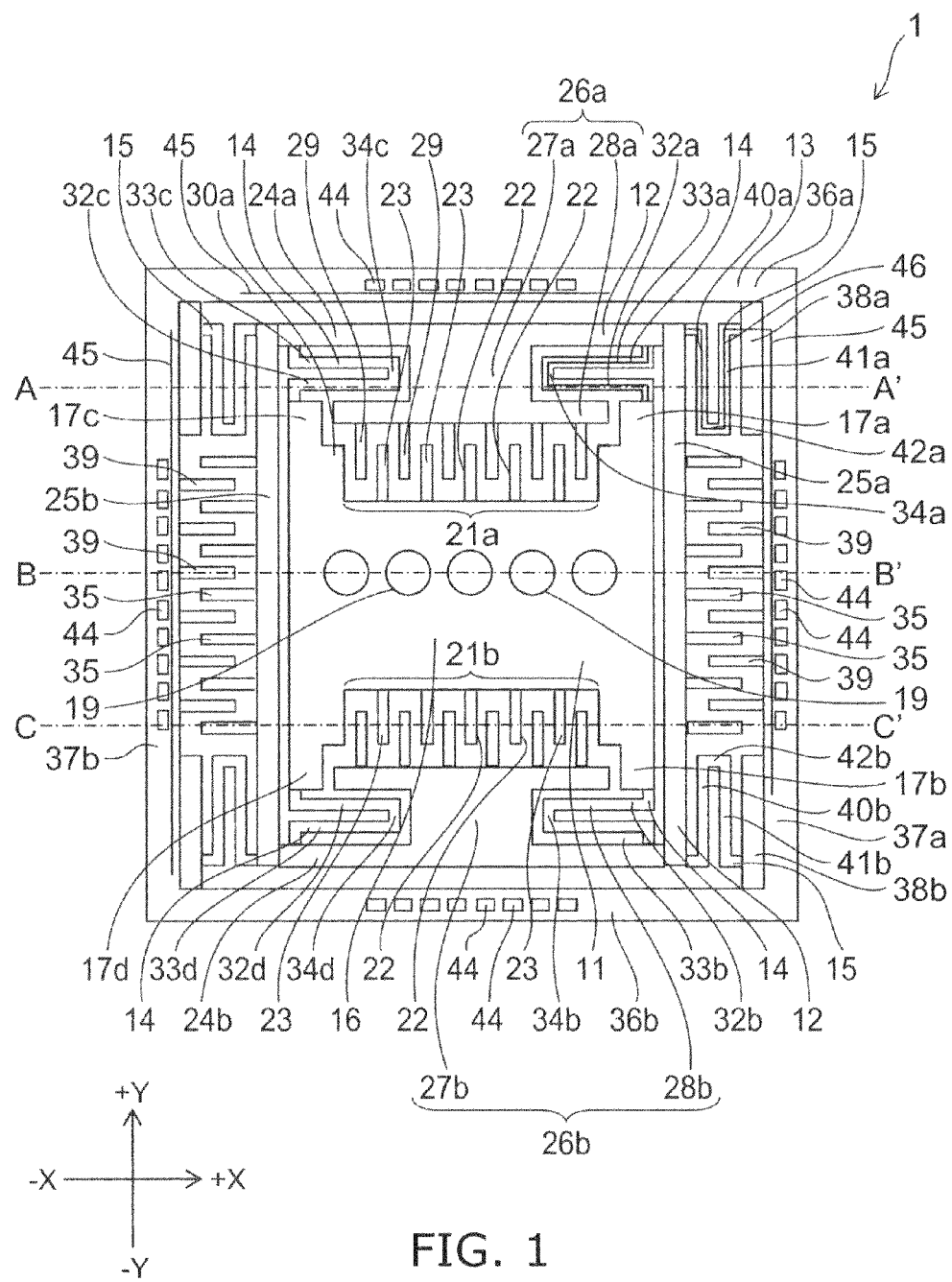
FIG. 1 is a plan view illustrating a camera shake correction device according to a first embodiment.

In general, according to one embodiment, a camera shake correction device includes a substrate, a fixed part, a linking part, a movable part, a first spring part, a second spring part, a first damper and a second damper. The fixed part is provided on the substrate and fixed to the substrate. The linking part is provided around the fixed part on the substrate that can move in a first direction within a plane of the substrate with respect to the fixed part. The movable part is provided on the substrate and arranged around the fixed part and the linking part that can move in a second direction that intersects with the first direction within the plane of the substrate. The first spring part is provided in which a first end is connected to the fixed part and a second end is connected to the linking part and wiring is provided on a top surface thereof. The second spring part is provided in which a first end is connected to the linking part and a second end is connected to the movable part, and wiring is provided on the surface thereof. The first damper is provided between the fixed part and the linking part. The second damper is provided between the linking part and the movable part.

According to another embodiment, a camera shake correction device includes a substrate, a movable part, a fixed part, a linking part, a first spring part and a second spring part. The movable part is provided on an inner part of a region directly below a through hole formed in the substrate that can move within a plane of the substrate. The fixed part is provided on a bottom surface of the substrate. The linking part is provided between the fixed part and the movable part that can move within the plane of the substrate. The first spring part is provided in which a first end is connected to the fixed part and a second end is connected to the linking part, and wiring is provided on a bottom surface thereof. The second spring part is provided in which a first end is connected to the linking part and a second end is connected to the movable part, and wiring is provided on a bottom surface thereof.

According to another embodiment, an imaging device includes an enclosure, a camera shake correction device, an image sensor in which a plurality of individual pixels are formed on a top surface thereof and an imaging lens. The camera shake correction device includes a substrate, a fixed part, a linking part, a movable part, a first spring part, a second spring part, a first damper and a second damper. The fixed part is provided on the substrate and fixed to the substrate. The linking part is provided around the fixed part on the substrate that can move in a first direction within a plane of the substrate with respect to the fixed part. The movable part is provided on the substrate and arranged around the fixed part and the linking part that can move in a second direction that intersects with the first direction within the plane of the substrate. The first spring part is provided in which a first end is connected to the fixed part and a second end is connected to the linking part and wiring is provided on a top surface thereof. The second spring part is provided in which a first end is connected to the linking part and a second end is connected to the movable part, and wiring is provided on the surface thereof. The first damper provided between the fixed part and the linking part. The second damper provided between the linking part and the movable part. The substrate is fixed to the enclosure. The image sensor is fixed to the movable part.

Various embodiments will be described hereinafter with reference to the accompanying drawings.

(First Embodiment)

Hereinafter, an embodiment of the invention will be described below with reference to the drawings.

First, a description will be given of a first embodiment.

FIG. 1 is a plan view illustrating a camera shake correction device according to the first embodiment.

Figure 2A:
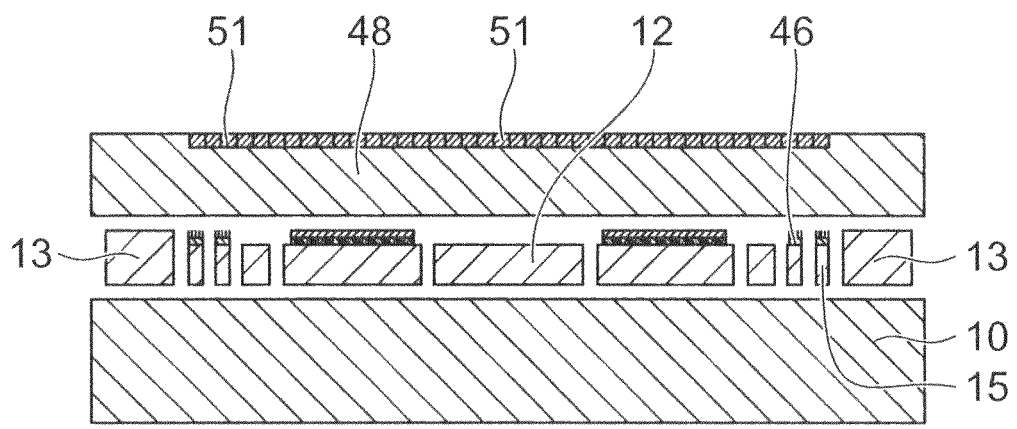
FIGS. 2A to 2C are cross-sectional views illustrating a camera shake correction device according to the first embodiment, where
Figure 2B:
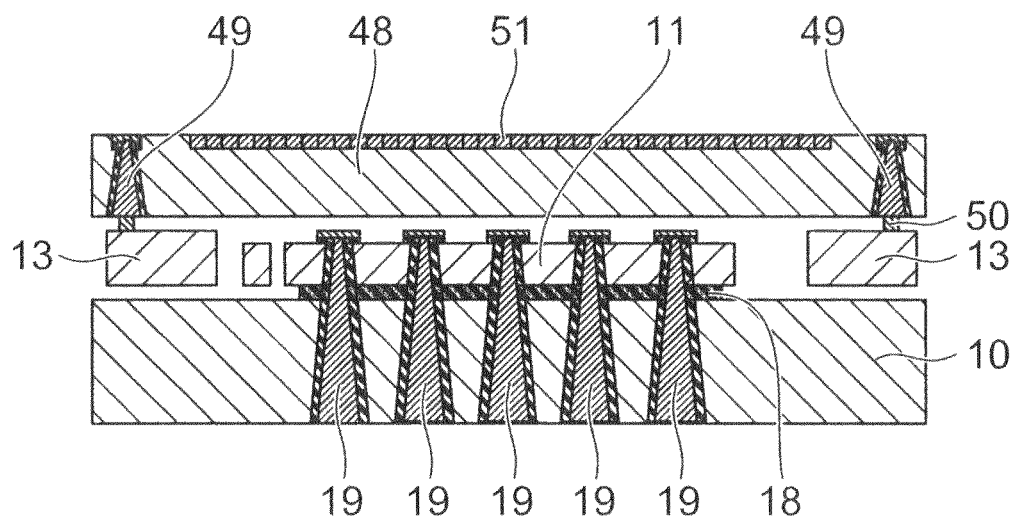
Figure 2C:
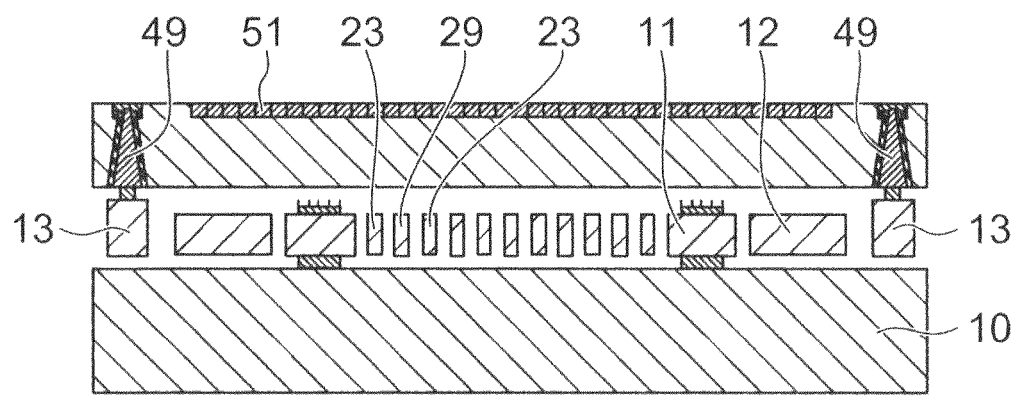

FIGS. 2A to 2C are cross-sectional views illustrating a camera shake correction device according to the first embodiment, where FIG. 2A is a cross-sectional view according to the line A-A' illustrated in FIG. 1, FIG. 2B is a cross-sectional view according to the line B-B' illustrated in FIG. 1, and FIG. 2C is a cross-sectional view according to the line C-C' illustrated in FIG. 1.

As illustrated in FIGS. 1, 2A, 2B, and 2C, the camera shake correction device 1 according to this embodiment includes a substrate 10, a fixed part 11, a frame shaped intermediate part 12 as a linking part, a movable part 13, a first spring part 14 that links the fixed part 11 and the frame shaped intermediate part 12, and a second spring part 15 that links the frame shaped intermediate part 12 and the movable part 13.

Note that, as will be described below, a CMOS image sensor (CIS) 48 is arranged on the movable part 13, but it is omitted in the illustration of FIG. 1. Further, in FIG. 1, an XY orthogonal coordinate system is adopted for explaining the camera shake correction device 1. In this XY orthogonal coordinate system, upward in the drawing is the +Y direction and the inverse direction thereof is the −Y direction. The "+Y direction" and the "−Y direction" may also be referred to comprehensively as the "Y direction". The direction rotated 90° in the direction in which a hand of a clock rotates from the +Y direction is the +X direction, and the inverse direction thereof is the −X direction. The "+X direction" and the "−X direction" may also be referred to comprehensively as the "−X direction".

The substrate 10 is a support substrate for a silicon on insulator (SOI) substrate that includes, for example, a silicon layer, an insulating layer, and a support substrate.

An H type fixed part 11 is provided on the substrate 10. The fixed part 11 is formed by, for example, machining the silicon layer of the SOI substrate. The fixed part 11 includes a rectangular plate shaped part 16 that is long in the X direction, a rectangular plate shaped part 17a that protrudes in the +Y direction from the end part of the +X direction of the plate shaped part 16, a rectangular plate shaped part 17b that protrudes in the −Y direction from the end part of the +X direction of the plate shaped part 16, a rectangular plate shaped part 17c that protrudes in the +Y direction from the end part of the −X direction of the plate shaped part 16, and a rectangular plate shaped part 17d that protrudes in the −Y direction from the end part of the −X direction of the plate shaped part 16.

As illustrated in FIG. 2B, an insulating film 18 is provided between the fixed part 11 and the substrate 10. The insulating film 18 is formed by, for example, machining an embedded insulating film in the SOI substrate. On the other hand, the insulating film 18 is not provided between the frame shaped intermediate part 12, the movable part 13, and the substrate 10.

Two through electrodes 19 are provided in a line in the X direction in the center part of the fixed part 11. The through electrodes 19 are provided by penetrating from the underside surface 20 of the substrate 10 through the substrate 10, the insulating film 18, and the fixed part 11.

A comb shaped part 21a is provided between the plate shaped part 17a and the plate shaped part 17c on the fixed part 11. The comb shaped part 21a has a plurality of notches 22 formed in the −Y direction along the edge that extends in the X direction of the +Y direction side on the fixed part 11. The portions corresponding to between the notches 22 on the fixed part 11 are raised parts 23 that are projected in the +Y direction.

In a similar manner, a comb shaped part 21b is provided between the plate shaped part 17b and the plate shaped part 17d on the fixed part 11. The comb shaped part 21b has a plurality of notches 22 formed in the +Y direction along the edge that extends in the X direction of the −Y direction side on the fixed part 11. The portion corresponding to between the notches 22 on the fixed part 11 is a plurality of raised parts 23 that are projected in the +Y direction.

The insulating film 18 is not provided between the raised parts 23 and the substrate 10. In other words, the plurality of raised parts 23 are supported by the main body part of the fixed part 11.

Around the fixed part 11 on the substrate 10, the frame shaped intermediate part 12 is provided so as to encompass the fixed part 11. In other words, the H type fixed part 11 is arranged on the inner side of a frame of the frame shaped intermediate part 12. The frame shaped intermediate part 12 is provided in the shape of a quadrilateral frame where two side members 24a and 24b that extend in the X direction and two side members 25a and 25b that extend in the Y direction are joined. In the frame shaped intermediate part 12, the side member 24a corresponds to the side on the +Y direction side, the frame 24b corresponds to the side on the −Y direction side, the frame 25a corresponds to the side on the +X direction side, and the frame 25b corresponds to the side on the −X direction side.

A plate shaped part 26a in the shape of a T is provided on the inner side of the side member 24a in the frame shaped intermediate part 12. The plate shaped part 26a includes a rectangular plate shaped part 27a joined to the side member 24a, and a plate shaped part 28a that extends in the X direction joined to the end part of the −Y direction of the plate shaped part 27a. The length of the X direction of the plate shaped part 28a is longer than the length of the X direction of the plate shaped part 27a. The plate shaped part 28a is provided so as to oppose the comb shaped part 21a of the fixed part 11. A plurality of raised parts 29 that are projected in the −Y direction are provided on the −Y direction side of the plate shaped part 28a. Each raised part 29 is inserted into each notch 22 in the comb shaped part 21a. A gap is provided between each raised part 29 and raised part 23. The inside of this gap becomes an air layer. A first damper 30a is provided by the plurality of raised parts 23 and a plurality of raised parts 29.

A plate shaped part 26b in the shape of a T is provided on the inner side of the side member 24b in the frame shaped intermediate part 12. The plate shaped part 26b includes a rectangular plate shaped part 27b joined to the side member 24b, and a plate shaped part 28b that extends in the X direction joined to the end part of the +Y direction of the plate shaped part 27b. The length of the X direction of the plate shaped part 28b is longer than the length of the X direction of the plate shaped part 27b. The plate shaped part 28b is provided so as to oppose the comb shaped part 21b of the fixed part 11. A plurality of raised parts 29 that are projected in the +Y direction are provided on the +Y direction side of the plate shaped part 28b. Each raised part 29 is inserted into each notch 22 in the comb shaped part 21a. A gap is provided between each raised part 29 and raised part 23. The inside of this gap becomes an air layer. A first damper 30b is provided by the plurality of raised parts 23 and the plurality of raised parts 29.

A plurality of raised parts 35 that are projected in the +X direction is provided in the center part of the side member 25a. A plurality of raised parts 35 that are projected in the −X direction is provided in the center part of the side member 25b.

The frame shaped intermediate part 12 and the fixed part 11 are linked by four first spring parts 14a to 14d. The insulating film 18 is not provided between the first spring parts 14a to 14d and the substrate 10. The shape of each first spring part is a U-shape curved so that both end parts extend in the Y direction and are linked at the side surface that faces the Y direction on the fixed part 11 and the frame shaped intermediate part 12. By this, the frame shaped intermediate part 12 can move within a fixed range with regard to the fixed part 11 in the Y direction. More detailed descriptions are given hereinafter of the respective shapes of the first spring parts 14a to 14d.

The first spring part 14a is provided between the side member 24a and the plate shaped part 28a and between the side member 25a and the plate shaped part 27a.

With the first spring part 14a, the end parts in the −X direction of two rectangular plate shaped parts 32a and 33a that extend in the X direction are mutually linked by the rectangular plate shaped part 34a that extends in the Y direction, and the end part in the +X direction of the plate shaped part 32a on the fixed part 11 side from among the two plate shaped parts 32a and 33a bends to the −Y direction and links with the plate shaped part 17a of the fixed part 11, while the end part in the +X direction of the plate shaped part 33a on the frame shaped intermediate part 12 side from among the two plate shaped parts 32a and 33a bends to the +Y direction and links with the frame 24a of the frame shaped intermediate part 12.

The first spring part 14b is provided between the side member 24b and the plate shaped part 28b and between the side member 25a and the plate shaped part 27b.

With the first spring part 14b, the end parts in the −X direction of two rectangular plate shaped parts 32b and 33b that extend in the X direction are mutually linked by the rectangular plate shaped part 34b that extends in the Y direction, and the end part in the +X direction of the plate shaped part 32b on the fixed part 11 side from among the two plate shaped parts 32b and 33b bends to the +Y direction and links with the plate shaped part 17b of the fixed part 11, while the end part in the +X direction of the plate shaped part 33b on the frame shaped intermediate part 12 side from among the two plate shaped parts 32b and 33b bends to the −Y direction and links with the frame 24b of the frame shaped intermediate part 12.

The first spring part 14c is provided between the side member 24a and the plate shaped part 28a and between the side member 25b and the plate shaped part 27a.

With the first spring part 14c, the end parts in the +X direction of two rectangular plate shaped parts 32c and 33c that extend in the X direction are mutually linked by the rectangular plate shaped part 34c that extends in the Y direction, and the end part in the −X direction of the plate shaped part 32c on the fixed part 11 side from among the two plate shaped parts 32c and 33c bends to the −Y direction and links with the plate shaped part 17c of the fixed part 11, while the end part in the −X direction of the plate shaped part 33c on the frame shaped intermediate part 12 side from among the two plate shaped parts 32c and 33c bends to the +Y direction and links with the frame 24b of the frame shaped intermediate part 12.

The first spring part 14d is provided between the side member 24b and the plate shaped part 28b and between the side member 25b and the plate shaped part 27b.

With the first spring part 14d, the end parts in the +X direction of two rectangular plate shaped parts 32d and 33d that extend in the X direction are mutually linked by the rectangular plate shaped part 34d that extends in the Y direction, and the end part in the −X direction of the plate shaped part 32d on the fixed part 11 side from among the two plate shaped parts 32d and 33d bends to the +Y direction and links with the plate shaped part 17d of the fixed part 11, while the end part in the −X direction of the plate shaped part 33b on the frame shaped intermediate part 12 side from among the two plate shaped parts 32b and 33b bends to the −Y direction and links with the frame 24b of the frame shaped intermediate part 12.

Around the frame shaped intermediate part 12, the movable part 13 is provided so as to encompass the frame shaped intermediate part 12. In other words, the frame shaped intermediate part 12 is arranged on the inner side of a frame of the movable part 13. The movable part 13 is provided in the shape of a quadrilateral frame where two side members 36a and 36b that extend in the X direction and two side members 37a and 37b that extend in the Y direction are joined. In the movable part 13, the side member 36a corresponds to the side on the +Y direction side, the side member 36b corresponds to the side on the −Y direction side, the side member 37a corresponds to the side on the +X direction side, and the side member 37b corresponds to the side on the −X direction side.

Rectangular platform parts 38a and 38b are provided on the end of the +Y direction and on the end on the −Y direction on the inner side of the side member 37a. Further, a plurality of raised parts 39 that are projected in the −X direction are provided in the center part of the inner side of the side member 37a. Each of the raised parts 39 are arranged between each raised part 35 that is projected in the +X direction of the frame 25a of the frame shaped intermediate part. A Second damper 99a is provided by the plurality of raised parts 35 and the plurality of raised parts 39.

Rectangular platform parts 38c and 38d are provided on the end of the +Y direction and on the end on the −Y direction on the inner side of the side member 37b. Further, a plurality of raised parts 39 that are projected in the +X direction are provided in the center part of the inner side of the side member 37b. Each of the raised parts 39 are arranged between each raised part 35 that is projected in the −X direction of the frame 25b of the frame shaped intermediate part. A second damper 99b is provided by the plurality of raised parts 35 and the plurality of raised parts 39. A gap is formed between the raised part 35 and the raised part 39 to be an air layer.

The frame shaped intermediate part 12 and the movable part 13 are linked by four second spring parts 15a to 15d. The insulating film 18 is not provided between the second spring parts 15a to 15d and the substrate 10. The shape of each second spring part is a U shape curved so that both end parts extend in the X direction and are linked at the side surface that faces the X direction on the movable part 13 and the frame shaped intermediate part 12. By this, the movable part 13 can move within a fixed range with regard to the frame shaped intermediate part 12 in the X direction. More detailed descriptions are given hereinafter of the respective shapes of the second spring parts 15a to 15d.

The second spring part 15a is provided between the platform part 38a and the side member 25a and between the side member 36a and the raised part 35.

With the second spring part 15a, the end parts in the −Y direction of two rectangular plate shaped parts 40a and 41a that extend in the Y direction are mutually linked by the rectangular plate shaped part 42a that extends in the X direction, and the end part in the +Y direction of the plate shaped part 40a on the frame shaped intermediate part 12 side from among the two plate shaped parts 40a and 41a bends to the −X direction and links with the end part in the +Y direction on the side member 25a of the frame shaped intermediate part 12, while the end part in the +Y direction of the plate shaped part 41a on the movable part 13 side bends to the +X direction and links with the platform part 38a.

The second spring part 15b is provided between the platform part 38b and the side member 25a and between the side member 36b and the raised part 35.

With the second spring part 15b, the end parts in the +Y direction of two rectangular plate shaped parts 40b and 41b that extend in the Y direction are mutually linked by the rectangular plate shaped part 42b that extends in the X direction, and the end part in the −Y direction of the plate shaped part 40b on the frame shaped intermediate part 12 side from among the two plate shaped parts 40b and 41b bends to the −X direction and links with the end part in the −Y direction on the side member 25a of the frame shaped intermediate part 12, while the end part in the −Y direction of the plate shaped part 41b on the movable part 13 side bends to the +X direction and links with the platform part 38b.

The second spring part 15c is provided between the platform part 38c and the side member 25b and between the side member 36a and the raised part 35.

With the second spring part 15c, the end parts in the −Y direction of two rectangular plate shaped parts 40c and 41c that extend in the Y direction are mutually linked by the rectangular plate shaped part 42c that extends in the X direction, and the end part in the +Y direction of the plate shaped part 40c on the frame shaped intermediate part 12 side from among the two plate shaped parts 40c and 41c bends to the +X direction and links with the end part in the +Y direction on the side member 25b of the frame shaped intermediate part 12, while the end part in the +Y direction of the plate shaped part 41c on the movable part 13 side bends to the −X direction and links with the platform part 38c.

The second spring part 15d is provided between the platform part 38d and the side member 25b and between the side member 36b and the raised part 35.

With the second spring part 15d, the end parts in the +Y direction of two rectangular plate shaped parts 40d and 41d that extend in the Y direction are mutually linked by the rectangular plate shaped part 42d that extends in the X direction, and the end part in the −Y direction of the plate shaped part 40d on the frame shaped intermediate part 12 side from among the two plate shaped parts 40d and 41d bends to the +X direction and links with the end part in the −Y direction on the side member 25b of the frame shaped intermediate part 12, while the end part in the −Y direction of the plate shaped part 41d on the movable part 13 side bends to the −X direction and links with the platform part 38d.

A plurality of electrode pads 44 are arranged on the upper surface 43 of the side members 36a, 36b, 37a, and 37b on the movable part 13 along the direction in which each side member extends.

On the upper surface of the movable part 13, wires 45 are connected to electrode pads 44 along the side members 36a, 36b, 37a, and 37b. Further, on the upper surface of the second spring part 15, wires 46 are provided along the plate shaped part 41, the plate shaped part 42, and the plate shaped part 40 of the second spring part 15. Also, the wires 45 are connected to the wires 46.

Also on the first spring part 14, wires 47 are provided along the plate shaped part 33, the plate shaped part 34, and the plate shaped part 32 of the first spring part 14. By this, the electrode pads 44 are connected to the through electrodes 19 via the wires 45, the wires 46, wires on the frame shaped intermediate part 14, the wires 47, and the wires of the fixed part 11.

A description follows hereafter of an imaging device according to this embodiment.

Figure 3:
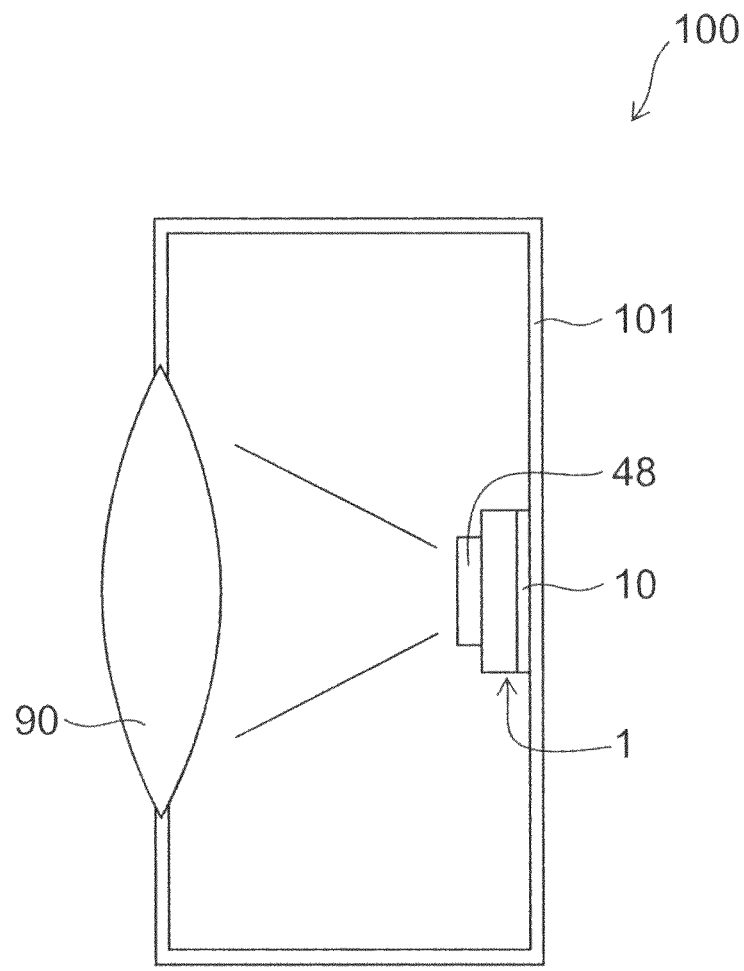
FIG. 3 is a perspective view schematically illustrating an imaging device according to the first embodiment.

FIG. 3 is a perspective view schematically illustrating an imaging device according to this embodiment.

In the imaging device 100 according to this embodiment, as illustrated in FIG. 3, an enclosure 101 is provided, and in the enclosure 101, an imaging lens 90 is attached. In the imaging device 100, an imaging optical system that includes the imaging lens 90 is provided. Further, within the enclosure 101, the camera shake correction device 1 described above is provided. The substrate 10 of the camera shake correction device 1 is fixed to the enclosure 101. Further, a CIS 48 is provided on the movable part 13 of the camera shake correction device 1. The CIP 48 is fixed to the movable part 13. On the top surface of the CIS 48, a plurality of individual pixels 51 are provided in a matrix. A through electrode is provided on the CIS 48. The bottom surface of the through electrode 49 is connected to the electrode pads 48 via a bump 50.

Next, a description will be given of the operation of the camera shake correction device 1 according to this embodiment.

Figure 4A:
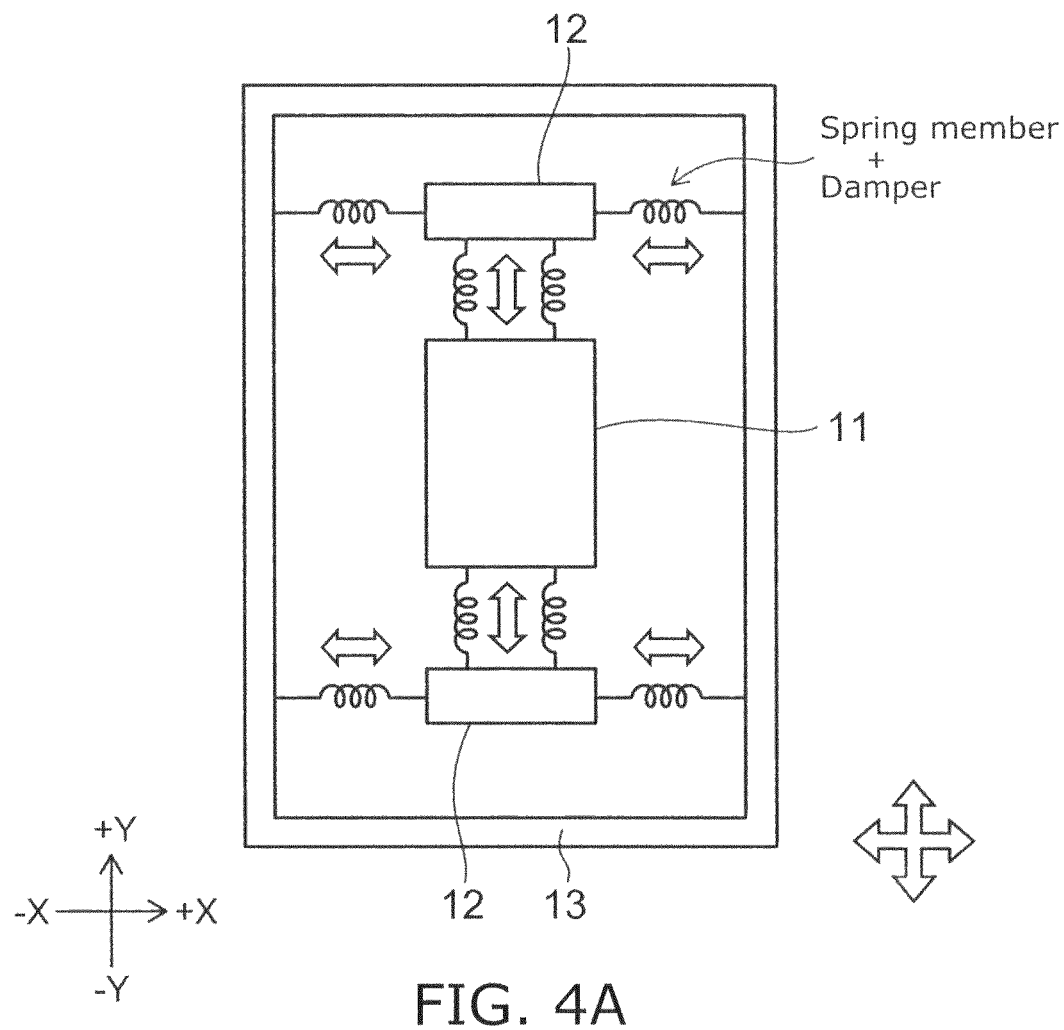
FIG. 4A is a plan view schematically illustrating the operation of the camera shake correction device 1 according to the first embodiment.
Figure 4B:
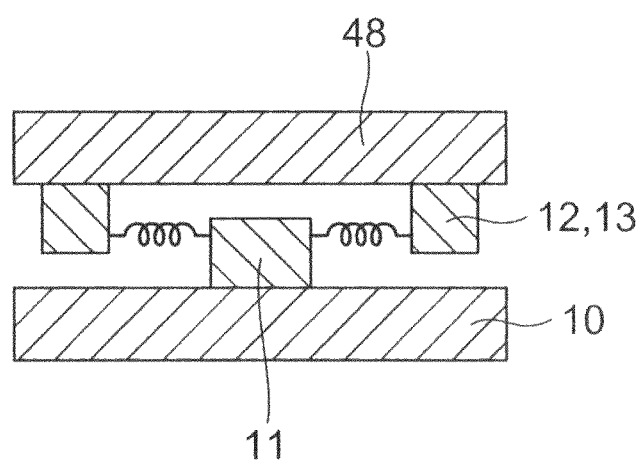
FIG. 4B is a cross-sectional view thereof.

FIG. 4A is a plan view schematically illustrating the operation of the camera shake correction device 1 according to this embodiment, and FIG. 4B is a cross-sectional view thereof.

FIGS. 4A and 4B illustrate the fixed part 11 fixed to the substrate 10. Meanwhile, the first spring parts 14a to 14d sag whereby the frame shaped intermediate part 12 can move in the Y direction within a fixed range with respect to the fixed part 11. At this time, the air layer between the raised part 23 of the comb shaped part 21a and the raised part 29 of the comb shaped part 21b functions as a cushion to alleviate sudden movement of the frame shaped intermediate part 12 thereby preventing the frame shaped intermediate part 12 from colliding with the fixed part 11. Note that in FIGS. 4A and 4B, the first spring parts 14a to 14d and the air layer between the comb shaped part 21 and the comb shaped part 21b are illustrated as a graphic symbol of a spring.

Further, the second spring parts 15a to 15d sag whereby the movable part 13 can move in the X direction within a fixed range with respect to the frame shaped intermediate part 12. At this time, the air layer between the raised part 35 and the raised part 39 functions as a cushion to alleviate sudden movement of the movable part 13 thereby preventing the movable part 13 from colliding with the frame shaped intermediate part 12. Note that in FIGS. 4A and 4B, the second spring parts 15a to 15d and the air layer between the comb shaped part 35 and the comb shaped part 39 are illustrated as a graphic symbol of a spring.

In this manner, the movable part 13 can move in the X direction with respect to the frame shaped intermediate part 12, and the frame shaped intermediate part 12 can move in the Y direction with respect to the fixed part 11, and therefore, the movable part 13 can move within a fixed range in relation to the X direction and the Y direction with respect to the fixed part 11. Accordingly, the pixels 51 of the CIS 48 can move within a fixed range with respect to the enclosure 101 of the imaging device 100.

Next, a description will be given of the operation to prevent camera shake at the time of imaging.

Figure 5A:
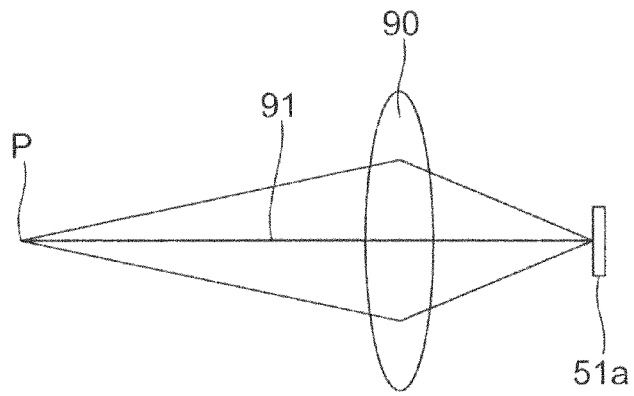
FIGS. 5A to 5C are views illustrating an example of the behavior of camera shake in the first embodiment, where
Figure 5B:
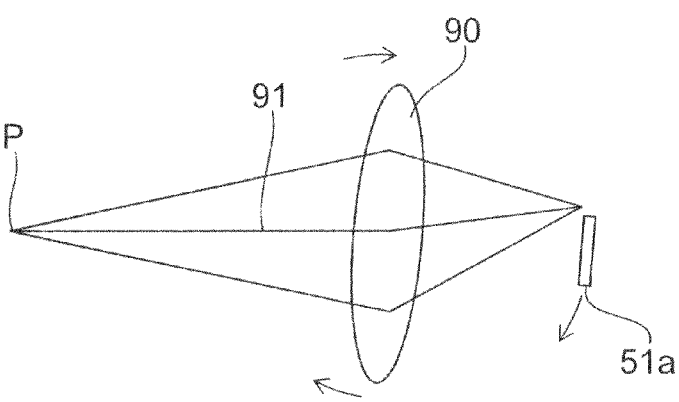
Figure 5C:
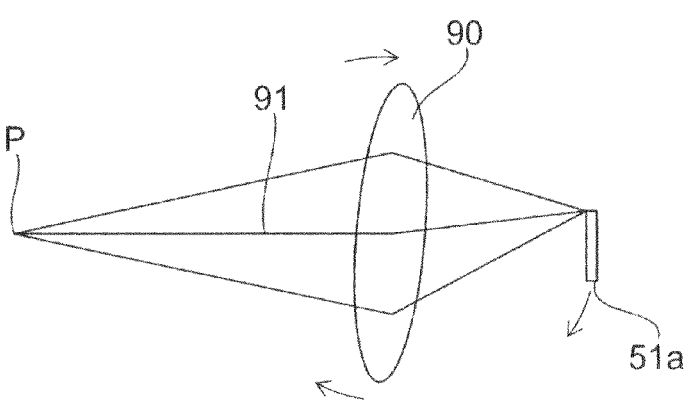

FIGS. 5A to 5C are views illustrating an example of the behavior of camera shake in the first embodiment, where FIG. 5A illustrates an example of prior to camera shake, FIG. 5B illustrates when the camera shake correction device is not provided, and FIG. 5C illustrates when the camera shake correction device is provided.

FIG. 5A illustrates a light receiving surface of the CIS 48 prior to camera shake arranged on the optical axis of the imaging lens 90. Then, light 91 emitted from a point P of the subject condenses on a certain pixel 51a. By this, the image of the subject is imaged on the light receiving surface of the CIS 48.

FIG. 5B illustrates a consideration of when the hand holding the imaging device moves at the time of imaging when using an imaging device in which the camera shake correction device 1 according to this embodiment is not incorporated therein.

The conjunction with the movement of the imaging device, the direction of the subject viewed from the imaging device changes during the time of exposure, and the angle that the light 91 emitted from the point P enters into the imaging lens 90 also changes, and therefore, the light 91 condenses in an off position from the pixel 51a. On account of this, camera shake occurs.

On the other hand, as illustrated in FIG. 5C, when the hand moves during imaging even in an imaging device in which the camera shake correction device 1 according to this embodiment is incorporated, the direction of the subject viewed from the imaging device changes. However, because the camera shake correction device 1 is incorporated in the imaging device 100 according to this embodiment, the CIS 48 can move with respect to the enclosure 101 of the imaging device 100. Therefore, the pixel 51a follows in a slight delay with respect to the movement of the imaging device 100. This results in the movement distance of the focal point of the light 91 on the light receiving surface of the CIS 48 is shorter during the time of exposure. By this, camera shake can be prevented or reduced.

Next, a description will be given of the effect of this embodiment.

According to the camera shake correction device 1 according to this embodiment, camera shake can be prevented or reduced.

Further, when considering from the incident direction of light, the movable part 13 is the same size as the CIS 48, the camera shake correction device 1 and the CIS are flip chip bonded, and the fixed part 11 is arranged on the inner part of the movable part 13 in a frame shape, therefore, the camera shake correction device 1 can be the same size as the CIS. Moreover, because the fixed part 11 and the movable part 13 are connected by wires formed on the upper surface of the spring parts in the camera shake correction device 1, there is no need for wire bonding. Therefore, the size of the camera shake correction device 1 can be made smaller.

Even more, because the camera shake correction device 1 does not require electric power, there is no need to equip a battery device in the camera shake correction device 1. Therefore, the camera shake correction device 1 can be made even smaller. By making the camera shake correction device 1 smaller, the imaging device 100 can also be made smaller.

(Second Embodiment)

Next, a description of a second embodiment will be given.

Figure 6:
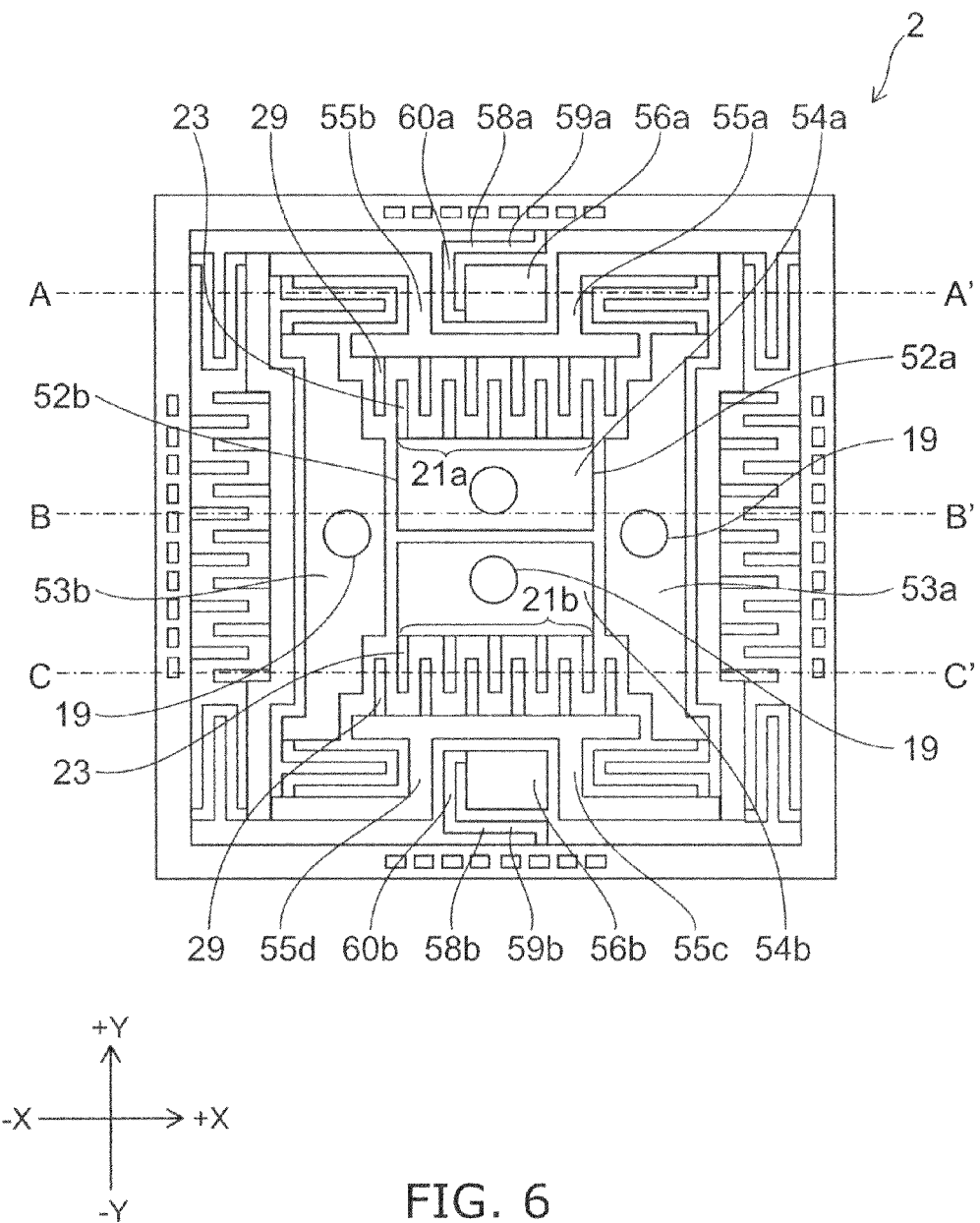
FIG. 6 is a plan view illustrating a camera shake correction device according to a second embodiment.

FIG. 6 is a plan view illustrating a camera shake correction device according to the second embodiment.

Figure 7A:
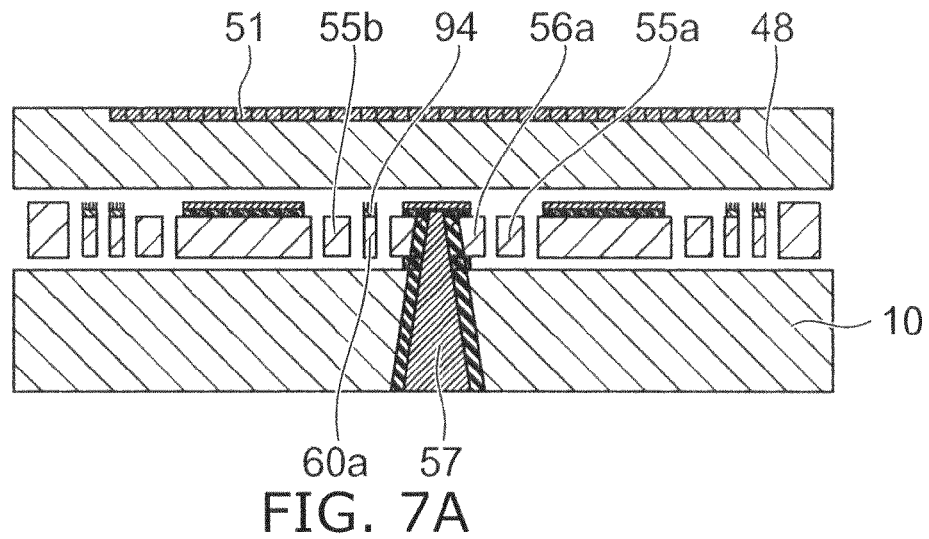
FIGS. 7A to 7C are cross-sectional views illustrating the camera shake correction device according to the second embodiment, where
Figure 7B:
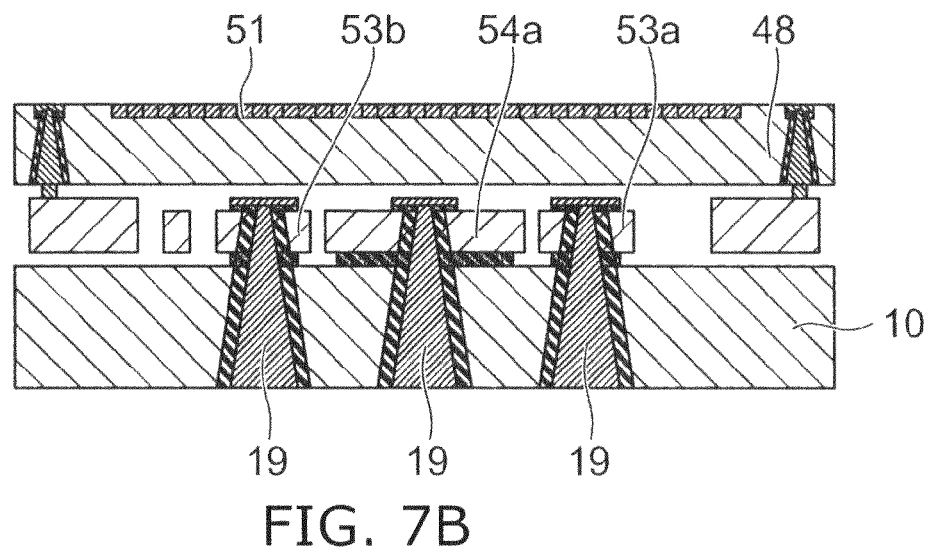
Figure 7C:
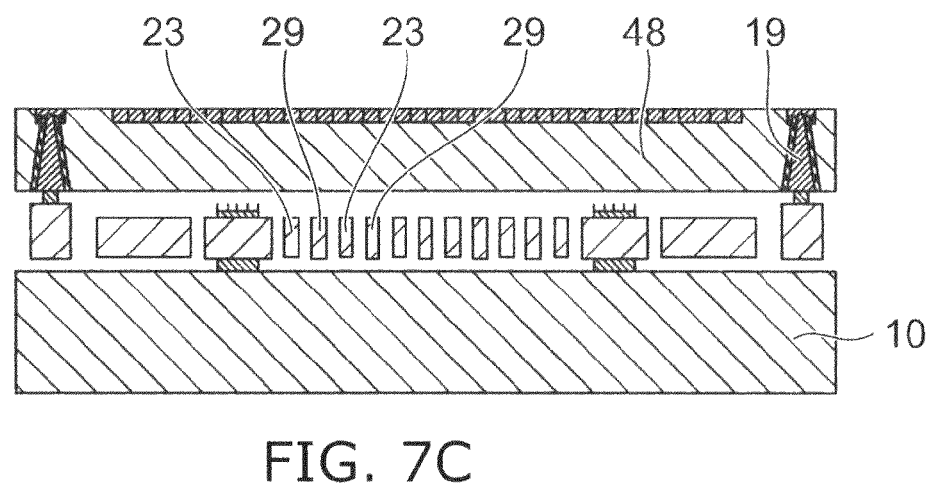

FIGS. 7A to 7C are cross-sectional views illustrating the camera shake correction device according to the second embodiment, where FIG. 7A is a cross-sectional view according to the line A-A' illustrated in FIG. 6, FIG. 7B is a cross-sectional view according to the line B-B' illustrated in FIG. 6, and FIG. 7C is a cross-sectional view according to the line C-C' illustrated in FIG. 6.

Figure 8:
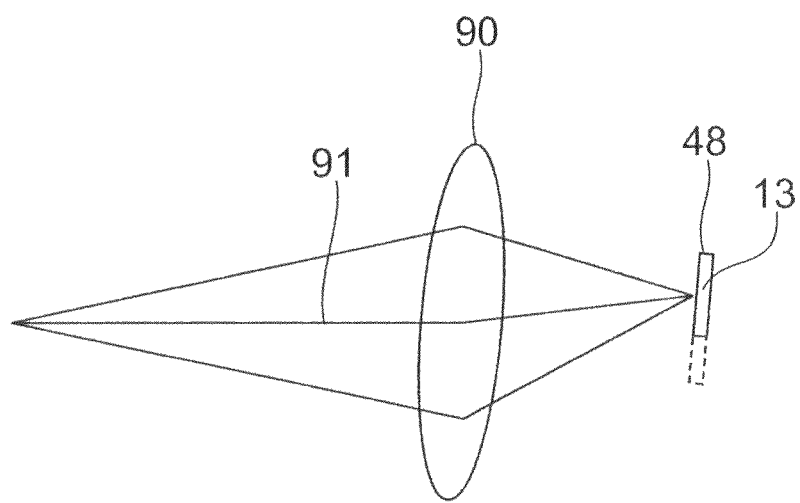
FIG. 8 is a view illustrating an example of the behavior of camera shake when the camera shake correction device according to the second embodiment is provided.

FIG. 8 illustrates an example of the behavior of camera shake when the camera shake correction device according to the second embodiment is provided.

In the camera shake correction device 2 according to this embodiment, as illustrated in FIGS. 6, 7A, 7B and 7C, the fixed part 11 is divided into four parts. In other words, it is divided into the four parts that include: the rectangular plate shaped part 53a arranged on the +X direction side from the line 52a that joins the side surface of the +X direction side of the raised parts 23 that are on the furthest +X direction for the comb shaped parts 21a and 21b; the rectangular plate shaped part 53b arranged on the −X direction side from the line 52b that joins the side surface of the −X direction side of the raised parts 23 that are on the furthest −X direction for the comb shaped parts 21a and 21b; the rectangular plate shaped part 54a of the +Y direction side of the portions divided in the Y direction interposed by the line 52a and line 52b; and the rectangular plate shaped part 54b of the −Y direction side of the portions divided in the Y direction interposed by the line 52a and line 52b. Through electrodes 19 are respectively provided in the four areas of the plate shaped part 53a, the plate shaped part 53b, the plate shaped part 54a, and the plate shaped part 54b.

Of those, the through electrode 19 connected in the plate shaped part 54a is connected to the raised parts 23 of the comb shaped part 21a by the wires (not illustrated) arranged in the plate shaped part 54a. The through electrode 19 connected in the plate shaped part 54b is connected to the raised parts 23 of the comb shaped part 21b by the wires (not illustrated) arranged in the plate shaped part 54b.

Further, the plate shaped part 27a in the frame shaped intermediate part 14 is removed, leaving a rectangular portion 55a along the side of the +X direction side and a rectangular portion 55b along the side of the −X direction side. Further, in the frame 24a, a portion from the position where the side surface of the −X direction side of the portion 55a touches, to the position where the side surface of the +X direction side of the portion 55b, is removed.

In addition, a rectangular fixed part 56a is provided in the portion where the frame 24a and the plate shaped part 27a were removed. Insulating film 18 is provided between the fixed part 56a and the substrate 10. Further, a through electrode 57 is provided that penetrates the substrate 10, the insulating film 18, and the fixed part 56a.

An L-shaped linking part 58a is provided between the fixed part 56a and the frame 36a on the movable part 13. The linking part 58a includes a rectangular plate shaped part 59a that extends in the X direction and a rectangular plate shaped part 60a that extends in the Y direction. The end part of the +Y direction side of the plate shaped part 60a is joined with the end part of the −X direction side of the plate shaped part 59a. The end part of the +X direction side of the plate shaped part 59a bends to the +Y direction and is connected to the frame 36a of the movable part 13. The end part of the −Y direction side of the plate shaped part 60a bends to the +X direction and is joined to the side surface of the −X direction side of the fixed part 56a.

Through electrode 57 provided on the fixed part 56a is connected to the wire 94 provided along the L-shaped linking part 58a. In addition, this is connected to the raised parts 29 via the frame 36a of the movable part 13, the second spring parts 15a and 15c, the frame 24a of the frame shaped intermediate part, the plate shaped parts 55a and 55c, and the plate shaped part 28.

Similarly, the plate shaped part 27b in the frame shaped intermediate part 14 is removed, leaving a rectangular portion 55c along the side of the +X direction side and a rectangular portion 55d along the side of the −X direction side. Further, in the frame 24b, a portion from the position where the side surface of the −X direction side of the portion 55c touches, to the position where the side surface of the +X direction side of the portion 55d, is removed.

In addition, a rectangular fixed part 56b is provided in the portion where the frame 24b and the plate shaped part 27b were removed. Insulating film 18 is provided between the fixed part 56b and the substrate 10. Further, a through electrode 57 is provided in the substrate 10, the insulating film 18, and the fixed part 56b that penetrates through these.

An L-shaped linking part 58b is provided between the fixed part 56b and the frame 36b on the movable part 13. The linking part 58b includes a rectangular plate shaped part 59b that extends in the X direction and a rectangular plate shaped part 60b that extends in the Y direction. The end part of the +−Y direction side of the plate shaped part 60b is joined with the end part of the −X direction side of the plate shaped part 59b. The end part of the +X direction side of the plate shaped part 59b bends to the −Y direction and is connected to the frame 36b of the movable part 13. The end part of the +Y direction side of the plate shaped part 60b bends to the +X direction and is joined to the side surface of the −X direction side of the fixed part 56b.

Through electrode 57 provided on the fixed part 56b is connected to the wire 94 provided along the L-shaped linking part 58b. In addition, this is connected to the raised parts 29 via the frame 36b of the movable part 13, the second spring parts 15b and 15d, the frame 24b of the frame shaped intermediate part, the plate shaped parts 55c and 55d, and the plate shaped part 28.

The configuration of this embodiment other than that described above is the same as the first embodiment as described previously.

Next, a description will be given of the operation of the camera shake correction device 2 according to this embodiment.

In the imaging device in which the camera shake correction device 2 according to this embodiment is incorporated, the fixed part 11 moves depending on the movement of the imaging device. However, applying potential to the through electrodes 19 and the through electrodes 57 causes an electrostatic force between the raised parts 23 and the raised parts 29.

By this, as illustrated in FIG. 6, the CIS 48 mounted on the movable part 13 is moved in the same direction as the direction in which the imaging device moves. Doing this prevents the exposing surface within the camera from moving during the time of exposure.

Next, a description will be given of the effect of this embodiment.

According to the camera shake correction device 2 according to this embodiment, applying a voltage between the through electrodes 19 and the through electrodes 57 makes it possible to control the movement of the movable part 13. Therefore, camera shake is suppressed and higher picture image quality is possible for picture images.

The effect of this embodiment other than that described above is the same as the first embodiment as described previously.

(Third Embodiment)

Next, a description will be given of a third embodiment.

Figure 9:
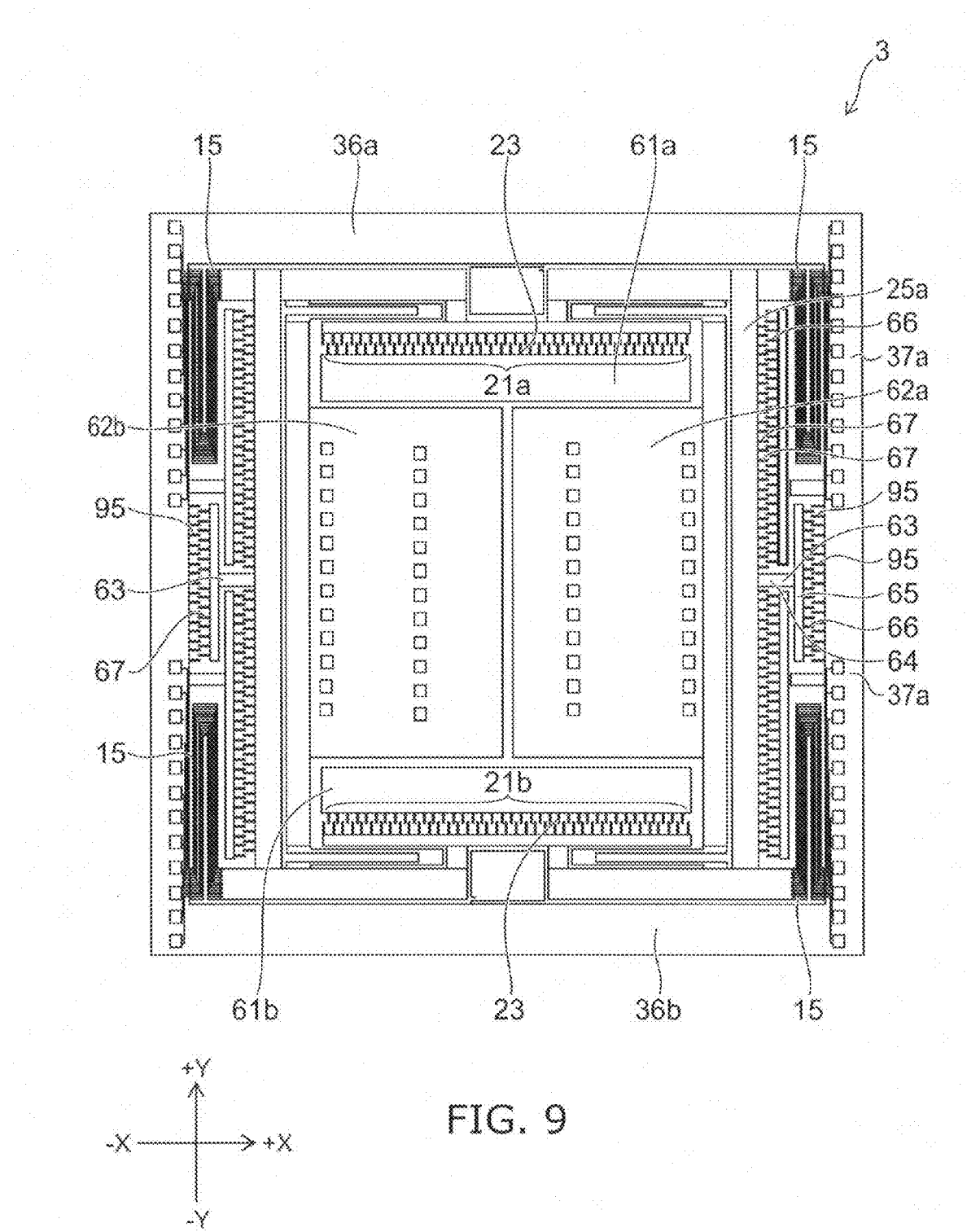
FIG. 9 is a plan view illustrating a camera shake correction device according to a third embodiment.

FIG. 9 is a plan view illustrating a camera shake correction device according to the third embodiment.

Figure 10:
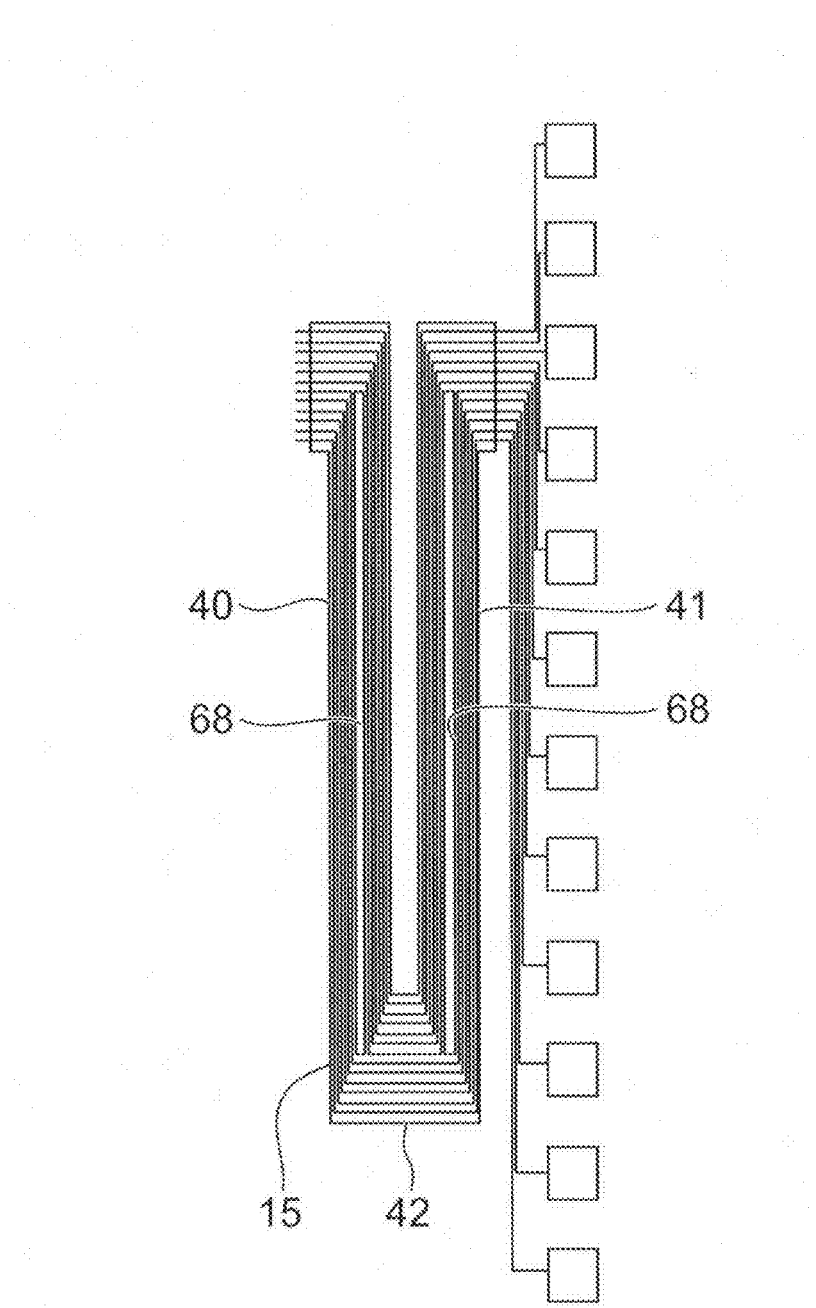
FIG. 10 is a plan view illustrating the second spring part according to the third embodiment.

FIG. 10 is a plan view illustrating the second spring part according to the third embodiment.

In this embodiment, the fixed part 11 is divided into four parts. In other words, it is divided into the four parts that include: a rectangular plate shaped part 61a along the comb shaped part 21a on the fixed part 11; a rectangular plate shaped part 61b along the comb shaped part 21b on the fixed part 11; a plate shaped part 62a of the +X direction side in which the portion other than the plate shaped parts 61a and 61b on the fixed part 11 are divided in two in the X direction; and a plate shaped part 62b of the −X direction side in which the portion other than the plate shaped parts 61a and 61b on the fixed part 11 are divided in two in the X direction. Through electrodes 19 are respectively provided in the four areas of the plate shaped part 61a, the plate shaped part 61b, the plate shaped part 62a, and the plate shaped part 62b.

Of those, the through electrode 19 connected in the plate shaped part 61a is connected to the raised parts 23 of the comb shaped part 21a by the wires (not illustrated) arranged in the plate shaped part 61a. The through electrode 19 connected in the plate shaped part 61b is connected to the raised parts 23 of the comb shaped part 21b by the wires (not illustrated) arranged in the plate shaped part 61b.

A T-shaped part 63 is provided in the frame 25a in the frame shaped intermediate part 14. The T-shaped part 63 includes a rectangular plate shaped part 64 that extends in the X direction and a rectangular plate shaped part 65 that extends in the Y direction. One end of the plate shaped part 64 is joined to the center part in the Y direction of the plate shaped part 65. A plurality of raised parts 66 are provided on the side surface where the plate shaped part 64 is not connected on the plate shaped part 65. The direction in which the plurality of raised parts 66 are provided in the T-shaped part 63 is referred to as the comb direction. The T-shaped part 63 is provided in the center of the +X direction of the frame 25a with the comb direction as the +X direction. Further, a plurality of raised parts 67 is provided in the +X direction side of the frame 25a.

The T-shaped part 63 is provided in the center of the −X direction of the frame 25b with the comb direction as the −X direction. A plurality of raised parts 67 is provided in the −X direction side of the frame 25a.

A plurality of raised parts 95 is provided in the center part of the −X direction side of the frame 37a of the movable part 13 so as to be interposed one at a time between each of the plurality of raised parts 66 of the T-shaped part 63 provided in the frame 25a of the frame shaped intermediate part 14. The two T-shaped parts 63 are provided with the comb direction as the −X direction so as to interpose the plurality of raised parts 95 in the −X direction side of the frame 37a. The plurality of each raised part 66 of the T-shaped part 63 provided in the frame 37a is interposed one at a time between the plurality of each raised part 67 of the frame 25a.

A plurality of raised parts 95 is provided in the center part of the +X direction side of the frame 37b of the movable part 13 so as to be interposed one at a time between each of the plurality of raised parts 66 of the T-shaped part 63 provided in the frame 25b of the frame shaped intermediate part 14. Two of the T-shaped parts 63 are provided with the comb direction as the +X direction so as to interpose the plurality of raised parts 95 in the +X direction side of the frame 37a. The plurality of each raised part 66 of the T-shaped part 63 provided in the frame 37a is interposed one at a time between the plurality of each raised part 67 of the frame 25a.

As illustrated in FIG. 10, notches 68 that extend in the direction in which the plate shaped parts 40 and 41 extend are provided on the plate shaped parts 40 and 41 on the second spring part 15.

The configuration and operation of this embodiment other than that described above is the same as the first embodiment as described previously.

Next, a description will be provided of effect of the third embodiment.

In this embodiment, notches 68 are provided on the plate shaped parts 40 and 41 of the second spring part 15. Therefore, the elasticity of the second spring part 15 is increased and sudden movements of the imaging device can be buffered. Further, a plurality of dampers is provided in which raised parts are meshed with raised parts. Therefore, depending on the damper, sudden movements of the imaging device can be buffered.

(Fourth Embodiment)

Next, a description will be given of a fourth embodiment.

Figure 11:
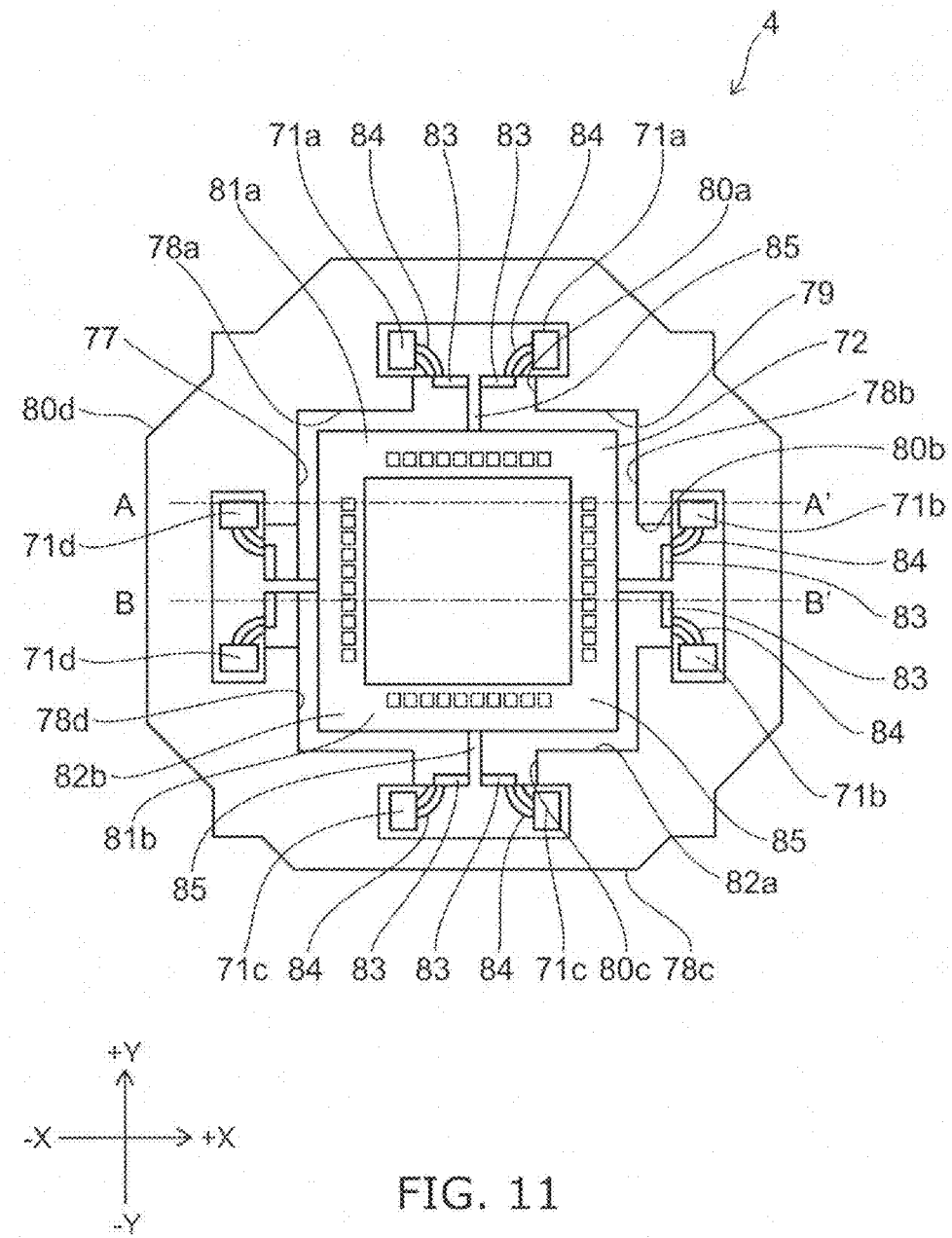
FIG. 11 is a plan view illustrating a camera shake correction device according to a fourth embodiment.

FIG. 11 is a plan view illustrating a camera shake correction device according to the fourth embodiment.

Figure 12A:
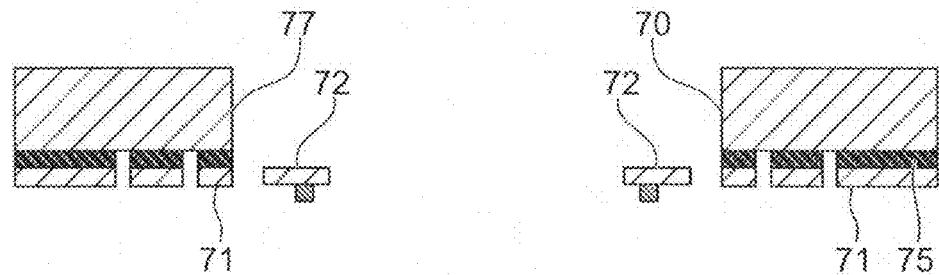
FIGS. 12A and 12B are cross-sectional views illustrating the camera shake correction device according to the fourth embodiment, where
Figure 12B:
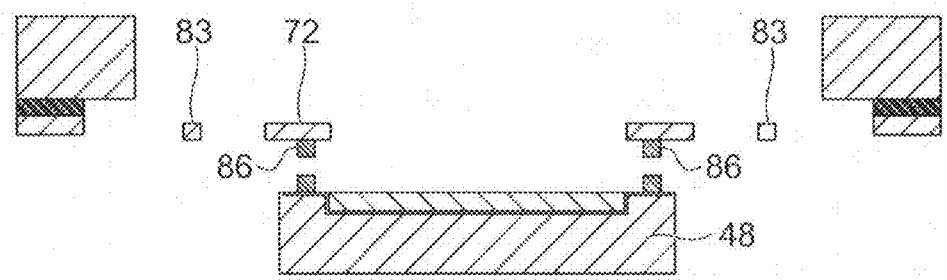

FIGS. 12A and 12B are cross-sectional views illustrating the camera shake correction device according to the fourth embodiment, where FIG. 12A is a cross-sectional view according to the line A-A' illustrated in FIG. 11 and FIG. 12B is a cross-sectional view according to the line B-B' illustrated in FIG. 11.

As illustrated in FIGS. 11, 12A, and 12B, a camera shake correction device 4 according to this embodiment includes a first spring part 84 that links a substrate 70, a fixed part 71, an intermediate part 83, a movable part 72, a fixed part 71, and an intermediate part 83 as well as a second spring part 85 that links an intermediate part 83 and the movable part 72.

FIG. 11 is a plan view as seen from underneath. Further, in FIG. 11, the CIS 48 is omitted. Also in FIG. 11, an XY orthogonal coordinate system is adopted for explaining the camera shake correction device 4. In this XY orthogonal coordinate system, upward in the drawing is the +Y direction and the inverse direction thereof is the –Y direction. The "+Y direction" and the "–Y direction" may also be referred to comprehensively as the "Y direction". The direction rotated 90° in the direction in which a hand of a clock rotates from the +Y direction is the +X direction, and the inverse direction thereof is the –X direction. The "+X direction" and the "–X direction" may also be referred to comprehensively as the "X direction".

The substrate 70 is a support substrate in an SOI substrate that includes, for example, a silicon layer 74, an insulating film 75, and a support substrate. With the substrate 70, the side on which the silicon layer 74 is provided, faces downward. A through hole 77 is provided in the substrate 70. The shape of the through hole 77 as viewed from underneath takes a shape made of a portion of a square 79 made of two parallel sides 78a and 78c in the X direction with two parallel sides 78b and 78d in the Y direction, and a portion of a square 80 provided so as to touch the center part of each side 78a to 78d. The side 78a is on the +Y direction side, and the side 78c is on the –Y direction side. The side 78b is on the +X direction side, and the side 78d is on the –X direction side.

The silicon layers 74 of the +X direction side and of the –X direction side of the square 80a on the +Y direction side of the square 79 are rectangular shapes making up the fixed part 71a isolated from other silicon layers 74. The silicon layers 74 of the +Y direction side and of the –Y direction side of the square 80b on the +X direction side of the square 79 are rectangular shapes making up the fixed part 71b isolated from other silicon layers 74. The silicon layers 74 of the +X direction side and of the –X direction side of the square 80c on the –Y direction side of the square 79 are rectangular shapes making up the fixed part 71c isolated from other silicon layers 74. The silicon layers 74 of the +Y direction side and of the –Y direction side of the square 80d on the –X direction side of the square 79 are rectangular shapes making up the fixed part 71d isolated from other silicon layers 74.

An insulating film 75 is provided between the fixed part 71 and the substrate 70.

A movable part 72 is provided underneath the portion of the square 79 in the through hole 77. The movable part 72 take the shape of a frame made of parallel frames 81a and 81b in the X direction and parallel frames 82a and 82b in the Y direction.

Two rectangular intermediate parts 83 are provided underneath the portion of each square 80 in the through hole 77. The intermediate part 83 and the fixed part 71 are linked by a first spring part 84. The intermediate part 83 and the movable part 72 are linked by a second spring part 85.

A plurality of electrode pads 86 are provided on the bottom surface of the movable part 72 along the frames 81a, 81b, 82a, and 82b of the movable part 72.

The CIS 48 is arranged on the movable part 72. The light receiving surface and the electrode pads 89 are provided on the top surface of the CIS 48.

The electrode pads 86 of the movable part 72 are connected to the electrode pads 89 provided on the upper surface of the CIS 48 via a bump.

Next, a description will be given of the operation of this embodiment.

In the camera shake correction device 4 of this embodiment, the fixed part 71 also moves depending on the movement of the imaging device when imaging device is moved. However, the first spring part 85 and the second spring part 84, by changing their own shapes, alleviate sudden movements of the fixed part 11 and prevent the exposing surface from moving.

The operation of this embodiment other than that described above is the same as the first embodiment as described previously.

Next, a description will be given of the effect of this embodiment.

In this embodiment, the movable part 72, in which the CIS 48 is equipped, is arranged on an inner part of a region directly below the through hole 77. Therefore, the thickness of the area where the CIS 48 is equipped, can be thin. Therefore, the camera shake correction device can be highly integrated.

(Fifth Embodiment)

Next, a description will be given of a fifth embodiment. This embodiment pertains to a method of manufacturing the camera shake correction device according to the fourth embodiment.

FIGS. 13A to 13D are process cross-sectional views illustrating the method of manufacturing the camera shake correction device according to the fifth embodiment.

Figure 13A:
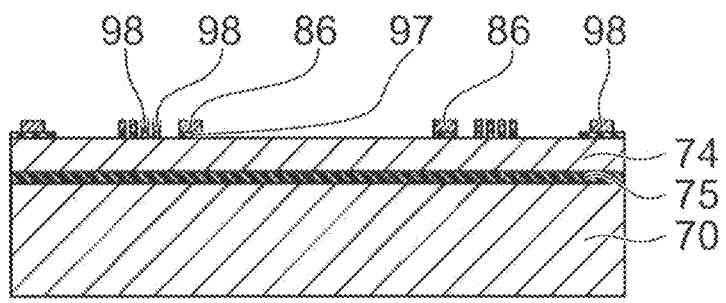
FIGS. 13A to 13D are process cross-sectional views illustrating the method of manufacturing the camera shake correction device according to a fifth embodiment.

As illustrated in FIG. 13A, an SOI substrate is prepared. Thereafter, a silicon oxide film 97 is formed on the silicon layer 74, and subsequently, aluminum is deposited. In addition, the aluminum film is removed except for the wiring 98 and the electrode pads 86.

Figure 13B:
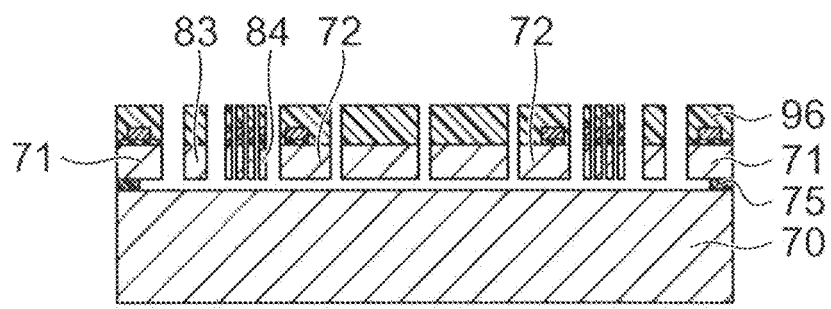

Next, as illustrated in FIG. 13B, a photoresist film 96 is formed on the silicon layer 74. The photoresist film 96 covers the portion where the fixed part 71, the movable part 72, the intermediate part 83, the first spring part 84, and the second spring part 85 are formed.

In addition, the photoresist film 96 is used as a mask in dry etching the silicon layer 74, and the fixed part 71, the movable part 72, the intermediate part 83, the first spring part 84, and the second spring part 85 are formed on an insulating film 75 of the SOI substrate. In addition, wet etching is performed to remove the insulating film 75 directly beneath the movable part 72, the intermediate part 83, the first spring part 84, and the second spring part 85 other than the fixed part 71.

Figure 13C:
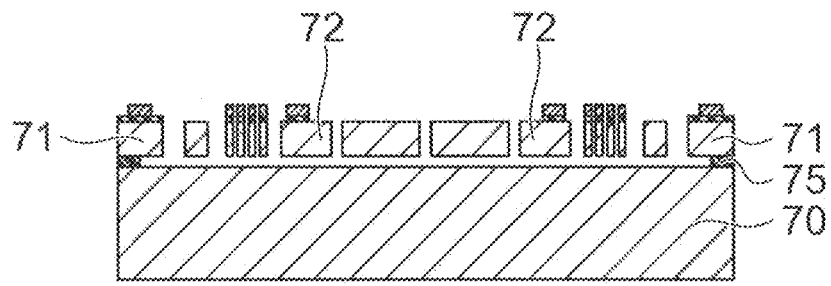

Additionally, as illustrated in FIG. 13C, the photoresist film 96 is removed.

Figure 13D:
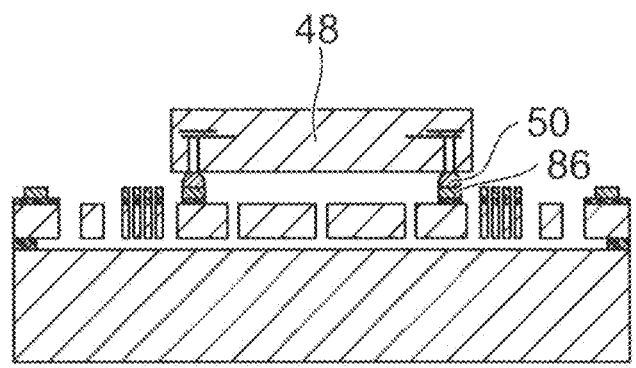

Afterwards, as illustrated in FIG. 13D, the chip of the CIS 48 is connected to the electrode pad 86 via the bump 50. Further, a through hole 77 is formed on the substrate 70 directly below the movable part 72. In this manner, the camera shake correction device 4, as illustrated in FIGS. 9 and 10, is manufactured.

Next, a description will be given of the effect of this embodiment.

By using an SOI wafer, the camera shake correction device 4 can be formed by using MEMS formation technology. Therefore, a highly integrated camera shake correction device 4 can be obtained.

According to the embodiment described above, a camera shake correction device that can have a small size can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A camera shakes correction device comprising: a substrate;
   a fixed part provided on the substrate and fixed to the substrate;
   a linking part, provided around the fixed part on the substrate, that can move in a first direction within a plane of the substrate with respect to the fixed part;
   a movable part, provided on the substrate and arranged around the fixed part and the linking part, that can move in a second direction that intersects with the first direction within the plane of the substrate;
   a first spring part in which a first end is connected to the fixed part and a second end is connected to the linking part, and wiring is provided on a top surface thereof;
   a second spring part in which a first end is connected to the linking part and a second end is connected to the movable part, and wiring is provided on the surface thereof;
   a first damper provided between the fixed part and the linking part; and
   a second damper provided between the linking part and the movable part.

2. The device according to claim 1, wherein the first damper includes
   a plurality of first raised parts that extend from the fixed part toward the linking part,
   a plurality of second raised parts that extend from the linking part toward the fixed part, and
   one of the second raised parts is interposed between two of the first raised parts,
   one of the first raised parts is interposed between two of the second raised parts, and
   a gap is provided between the first raised part and the second raised part.

3. The device according to claim 2, wherein voltage is applied between the first raised part and the second raised part to generate an electrostatic force between the first raised part and the second raised part in order to move the linking part.

4. The device according to claim 2, wherein the second damper includes
   a plurality of third raised parts that extend from the movable part toward the linking part, and
   a plurality of fourth raised parts that extend from the linking part toward the movable part, wherein
   one of the fourth raised parts is interposed between two of the third raised parts,
   one of the third raised parts is interposed between two of the fourth raised parts, and
   a gap is provided between the third raised part and the fourth raised part.

5. The device according to claim 4, wherein voltage is applied between the third raised part and the fourth raised part to generate an electrostatic force between the third raised part and the fourth raised part in order to move the movable part.

6. The device according to claim 4, wherein a direction in which the first raised parts and the second raised parts extend is orthogonal to a direction in which the third raised parts and the fourth raised parts extend.

7. The device according to claim 2, wherein the gap includes an air layer.

8. The device according to claim 1, further comprising an electrode pad formed on a top surface of the movable part.

9. The device according to claim 1, wherein the first spring part and the second spring part are respectively U-shaped members.

10. The device according to claim 9, wherein the first spring part includes two plate shaped parts that extend in one direction, and has a notch provided on each of the plate shaped parts.

11. The device according to claim 10, wherein the second spring part includes two plate shaped parts that extend in a direction that intersects the one direction, and has a notch provided on each of the plate shaped parts.

12. The device according to claim 1, further comprising an insulating layer arranged between the substrate and the fixed part, wherein
   the substrate is formed by machining a support substrate of an SOI substrate;
   the insulating layer is formed by machining an embedded insulating film of the SOI substrate; and
   the fixed part, the linking part, and the movable part are formed by machining a silicon layer of the SOI substrate.

13. The device according to claim 12, further comprising a through electrode that penetrates the substrate, the insulating layer, and the fixed part.

14. A camera shakes correction device comprising: a substrate;
   a movable part, provided on an inner part of a region directly below a through hole formed in the substrate, that can move within a plane of the substrate;
   a fixed part provided on a bottom surface of the substrate;
   a linking part, provided between the fixed part and the movable part, that can move within the plane of the substrate;
   a first spring part in which a first end is connected to the fixed part and a second end is connected to the linking part, and wiring is provided on a bottom surface thereof; and a second spring part in which a first end is connected to the linking part and a second end is connected to the movable part, and wiring is provided on a bottom surface thereof.

15. The device according to claim 14, wherein the first spring part and the second spring part are respectively U-shaped members.

16. The device according to claim 15, wherein the first spring part includes two plate shaped parts that extend in one direction, and has a notch provided on each of the plate shaped parts.

17. The device according to claim 16, wherein the second spring part includes two plate shaped parts that extend in a direction that intersects the one direction, and has a notch provided on each of the plate shaped parts.

18. The device according to claim 14, further comprising an insulating layer arranged between the substrate and the fixed part, wherein
 the substrate is formed by machining a support substrate of an SOI substrate;
 the insulating layer is formed by machining an embedded insulating film of the SOI substrate; and
 the fixed part, the linking part, and the movable part are formed by machining a silicon layer of the SOI substrate.

19. The device according to claim 14 further comprising an electrode pad formed on a bottom surface of the movable part.

20. An imaging device comprising: an enclosure;
 a camera shake correction device;
 an image sensor in which a plurality of individual pixels are formed on a top surface thereof; and
 an imaging lens,
wherein
the camera shake correction device includes:
a substrate;
a fixed part provided on the substrate and fixed to the substrate;
a linking part, provided around the fixed part on the substrate, that can move in a first direction within a plane of the substrate with respect to the fixed part;
a movable part, provided on the substrate and arranged around the fixed part and the linking part, that can move in a second direction that intersects with the first direction within the plane of the substrate;
a first spring part in which a first end is connected to the fixed part and a second end is connected to the linking part, and wiring is provided on a top surface thereof;
a second spring part in which a first end is connected to the linking part and a second end is connected to the movable part, and wiring is provided on a top surface thereof;
a first damper provided between the fixed part and the linking part; and
a second damper provided between the linking part and the movable part; wherein
the substrate is fixed to the enclosure, and
the image sensor is fixed to the movable part.

* * * * *